United States Patent
Tahata (10) Patent No.: US 7,965,045 B2
(45) Date of Patent: Jun. 21, 2011

(54) POWER SUPPLY CIRCUIT FOR DISPLAY UNIT AND DISPLAY UNIT

(75) Inventor: Takashi Tahata, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 758 days.

(21) Appl. No.: 12/007,438

(22) Filed: Jan. 10, 2008

(65) Prior Publication Data

US 2008/0178016 A1    Jul. 24, 2008

(30) Foreign Application Priority Data

Jan. 15, 2007    (JP) .................................. 2007-005309

(51) Int. Cl.
*G09G 3/00*    (2006.01)
(52) U.S. Cl. ..................................... 315/169.3; 345/204
(58) Field of Classification Search .................... 345/76, 345/77, 82, 204, 211, 212; 257/59; 315/169.3, 315/169.1, 169.2, 160
See application file for complete search history.

(56) References Cited

U.S. PATENT DOCUMENTS 7,285,797 B2 * 10/2007 Tobita .............................. 257/59

FOREIGN PATENT DOCUMENTS

| JP | 2000-37036 | 2/2000 |
| JP | 2002-6811 | 1/2002 |
| JP | 2004-151514 | 5/2004 |

* cited by examiner

*Primary Examiner* — David Hung Vu
(74) *Attorney, Agent, or Firm* — McGinn IP Law, PLLC (57) ABSTRACT

A power supply circuit for display unit according to one embodiment of the present invention includes a power supply circuit having outputs connected to a plurality of capacitance elements and supplying power to a plurality of drivers, and a controller switching connection of the power supply circuit and the capacitance elements depending on a use mode. The use mode includes a first use mode connecting one terminals of the capacitance elements to the power supply circuit or ground potential and a second use mode connecting one ends of the capacitance elements to the power supply circuit or floating one terminals of the capacitance elements.

15 Claims, 5 Drawing Sheets

POWER SUPPLY CIRCUIT FOR DISPLAY UNIT AND DISPLAY UNIT

BACKGROUND OF THE INVENTION

1. Field of the Invention

The present invention relates to a power supply circuit for display unit and a display unit outputting a plurality of power supply voltages.

2. Description of Related Art

Semiconductor integrated circuit is used as a circuit driving a liquid crystal display unit. In the liquid crystal display unit, power may repeatedly be turned on and off when a screen saver or the like is activated. Therefore, in the circuit driving the liquid crystal display unit, a large amount of power is consumed by frequently repeating ON/OFF. Therefore, reducing of power consumption is required in the circuit driving the liquid crystal display unit.

On the other hand, Japanese Unexamined Patent Application Publication No. 2000-37036 (Oda) discloses a technique reducing power consumption in the circuit. Oda discloses the technique disconnecting a capacitor and a power supply stabilization circuit and holding the charges stored in the capacitor when voltage is not output from the power supply stabilization circuit so as to reduce power consumption.

However, it is needed in the circuit driving the liquid crystal display unit to output a plurality of voltages to drive the liquid crystal display unit. Therefore, latch-up may occur if ON/OFF is repeated while charges are held in the capacitor. Specifically, decreasing level of the voltage is different between capacitors because the capacitance in the capacitor connected to the power supply circuit varies and leak current flowing in the power supply circuit also varies. Because voltage decreases due to this difference in the capacitance, when the power supply circuit stops working, magnitude correlation of voltage due to the residue charge in the capacitor may be reversed. When the circuit driving the liquid crystal display unit is activated again, latch-up tends to be occurred.

Figure 5:
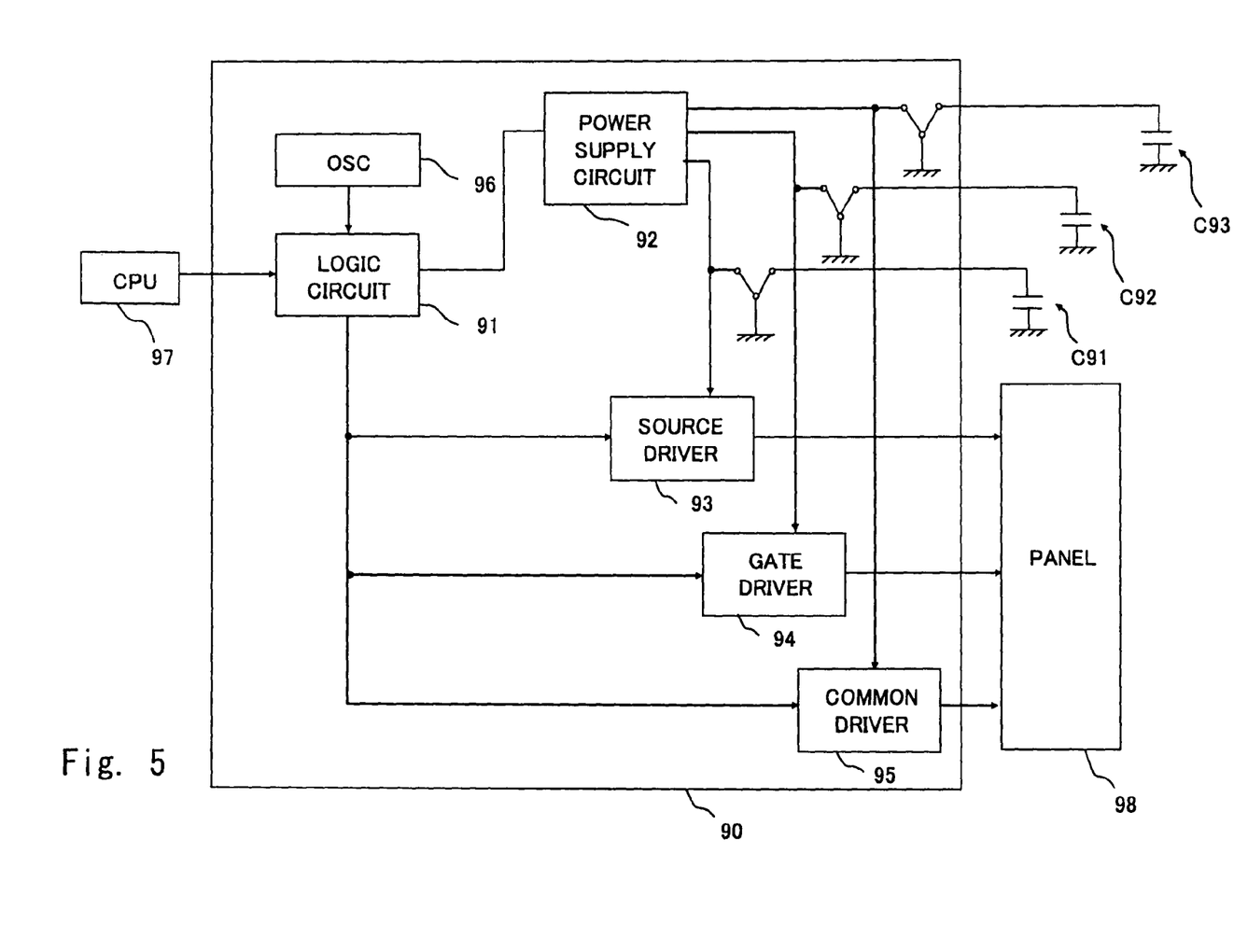
FIG. 5 shows a block diagram showing a display unit and a power supply circuit for display unit according to the related art.

In the conventional technique, latch-up is prevented by grounding both terminals of the capacitor to discharge charges in the capacitor every time the power of the liquid crystal display unit driving circuit is turned OFF (see Japanese Unexamined Patent Application Publication No. 2004-151514 (Kobayashi), and No. 2002-6811 (Ito), for example). FIG. 5 shows a block diagram of the display unit discharging charges of the capacitor according to the related technique.

As shown in FIG. 5, a display unit driving circuit 90 of the display unit includes a power supply circuit 92 connected to a logic circuit 91, a source driver 93, a gate driver 94, a common driver 95, and an oscillator (OSC) 96. The logic circuit 91 is connected to a central processing unit (CPU) 97 and receives control signal from the CPU 97 for operating. The source driver 93, the gate driver 94, and the common driver 95 are connected to a panel for display 98. Further, capacitors C91, C92, and C93 for power supply stabilization are formed externally to the display unit driving circuit 90 and connected to the display unit driving circuit 90. The charges stored in the capacitors C91 to C93 are discharged when the display unit does not work. When the power of the power supply circuit 92 are turned on in order to drive the display unit driving circuit 90, it is possible to prevent the occurrence of the latch-up between drivers connected to each of the capacitors C91 to C93 and the capacitors C91 to C93 because there are substantially no charges in the capacitors.

However, in the conventional display unit, charges stored in the capacitors C91 to C93 are discharged when voltage is not output from the power supply circuit 92 even when ON/OFF of the power supply circuit is repeated in such a short time that natural discharge of the capacitor does not cause any problem. Therefore, it is needed to store charges again in the capacitors C91 to C93 when voltage is output from the power supply circuit 92 again. This causes increase in power consumption in the related technique.

SUMMARY

To overcome the above-described problem, in one embodiment of the present invention, a power supply circuit for display unit includes a power supply circuit having outputs connected to a plurality of capacitance elements and supplying power to a plurality of drivers, and a controller switching connection of the power supply circuit and the capacitance elements depending on a use mode.

In one embodiment of the present invention, it is possible to store a certain amount of charge in the capacitance elements because switching connection of the power supply circuit and the capacitance elements depends on a use mode.

According to one embodiment of the power supply circuit for display unit, it is possible to prevent latch-up and to prevent increase of power consumption.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF REFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Hereinafter, the specific embodiment to which the present invention is applied will be described in detail with reference to the drawings. The present embodiment is the one in which the present invention is applied to a display unit and a power supply circuit for display unit. The display unit according to the present embodiment has two modes: a normal mode and a short time ON/OFF mode. The details thereof will be described later.

Figure 1:
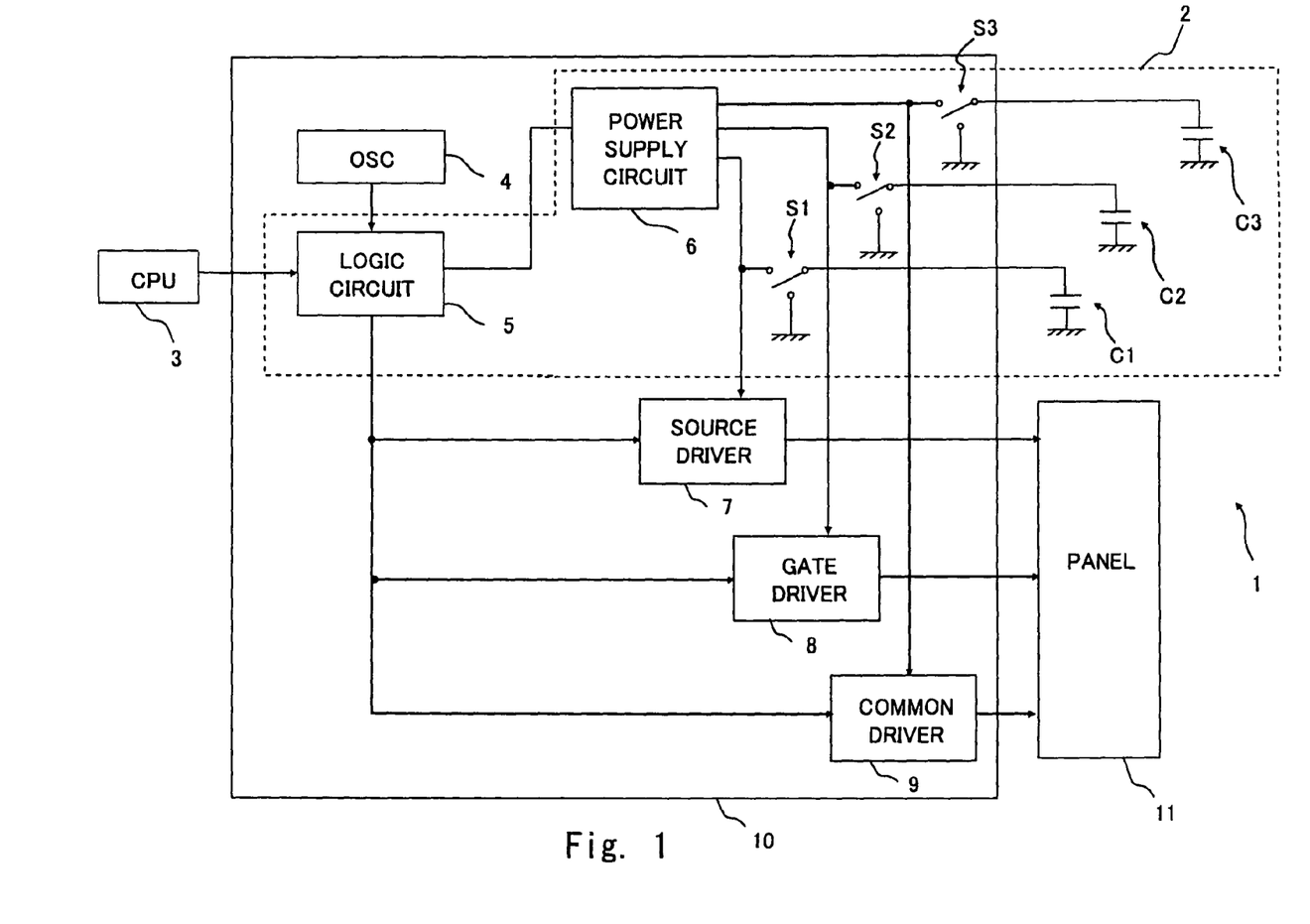
FIG. 1 shows a block diagram showing a display unit and a power supply circuit for display unit according to the present embodiment.

FIG. 1 shows a block diagram of a display unit 1 including a power supply circuit for display unit 2 according to the present embodiment. As shown in FIG. 1, the display unit 1 according to the present embodiment includes a central processing unit (CPU) 3, a display unit driving circuit 10, a plurality of capacitors C1 to C3, and a display panel 11. The display unit driving circuit 10 includes an oscillator (OSC) 4, a logic circuit (controller) 5, a power supply circuit 6, a source driver 7, a gate driver 8, a common driver 9, and switches S1 to S3. The plurality of capacitors C1 to C3 connected to the power supply circuit 6 are capacitors for stabilizing a power supply and are formed externally to the display unit driving circuit 10. The capacitor C1 is connected to the source driver 7 through the switch S1. The capacitor C2 is connected to the gate driver 8 through the switch S2. The capacitor C3 is connected to the common driver 9 through the switch S3. The display panel 11 is connected to the source driver 7, the gate driver 8, and the common driver 9. The power supply circuit for display unit 2 is composed by the logic circuit 5, the power supply circuit 6, switches S1 to S3, and capacitors C1 to C3 connected to the power supply circuit 6 through the switches S1 to S3, respectively. When the power supply circuit 6 works, voltage input to at least one capacitor is different from voltages input to other capacitors.

The CPU 3 is connected to the power supply circuit 6 through the logic circuit 5 and outputs various signals to the power supply circuit for display unit 2. For example, the CPU 3 outputs power ON signal or power OFF signal controlling voltages output from the power supply circuit 6, normal mode signal or short time ON/OFF mode signal, and display ON/OFF signal of the display panel 11 or the like. The power supply circuit 6 is the circuit outputting the plurality of voltages. Output/non-output of voltage is switched based on the power ON signal or the power OFF signal output from the CPU 3 to the power supply circuit 6 through the logic circuit 5. In other words, the power supply circuit 6 is connected to the power supply that is not shown and outputs power supply voltage to the source driver 7, the gate driver 8, the common driver 9, and capacitors C1 to C3 based on the input power supply voltage. The power supply circuit 6 raises power supply voltage that is input using a charge pump or the like to the voltage needed by each of the source driver 7, the gate driver 8, and the common driver 9 and outputs the voltage. The OSC 4 is connected to the logic circuit 5 and outputs the clock signal to the source driver 7, the gate driver 8, and the common driver 9 through the logic circuit 5. The clock signal displays the signal output from the source driver 7, the gate driver 8, and the common driver 9 to the display panel 11 in gray scale.

The power supply circuit for display unit 2 according to the present embodiment includes switches S1 to S3 between the plurality of outputs of the power supply circuit 6 and the capacitors C1 to C3 connected to the outputs. The switches S1 to S3 switch the connection of the power supply circuit 6 and the capacitors C1 to C3 depending on a use mode such as the normal mode and short time ON/OFF mode, for example. In the normal mode, the output/non-output of voltage of the power supply circuit 6 is switched based on the power ON signal or the power OFF signal input to the power supply circuit 6. On the other hand, in the short time ON/OFF mode, the ON/OFF of the power supply circuit 6 is switched in a short time as in the screen saver of the liquid crystal display unit, for example, and voltage is constantly output from the power supply circuit 6 regardless of whether the signal input to the power supply circuit 6 is the power ON signal or power OFF signal. However, when the power OFF signal is input, the power supply circuit 6 does not raise voltage for reducing the power consumption. In such a case, the voltage output from the power supply circuit 6 is decreased depending on the current flowing in accordance with each load of the outputs of the power supply circuit 6 and leak current of the power supply circuit 6. The voltage output from the power supply circuit 6 may be decreased to the input voltage value of the power supply circuit 6 at maximum. The clock signal is not input to the drivers that are the loads connected to the outputs of the power supply circuit 6 and the drivers do not flow bias current. In other words, when the power OFF signal is input in the short time ON/OFF mode, only the leak current normally flows in the power supply circuit for display unit 10. Further, as will be described later, when the power OFF signal is input to the power supply circuit 6 in the short time ON/OFF mode, the switches are disconnected and one terminals of the capacitors are floated. At this time, only a small amount of charge is naturally discharged from the capacitors C1 to C3 before the output voltage from the power supply circuit 6 is applied to the capacitors C1 to C3 next time. The short time ON/OFF mode is the mode repeating ON/OFF of the power supply circuit 6 in such a short time that the latch-up does not occur by the charges stored in the capacitors C1 to C3 when the capacitors C1 to C3 and the power supply circuit 6 are connected again.

In summary, when the signal input to the power supply circuit 6 is the power ON signal in the short time ON/OFF mode, voltage is output from the power supply circuit 6, and the power supply circuit 6 and the capacitors C1 to C3 are connected. On the other hand, when the signal input to the power supply circuit 6 is the power OFF signal in the short time ON/OFF mode, voltage is output from the power supply circuit 6, but the power supply circuit 6 and the capacitors C1 to C3 are disconnected. In such a case, the switches are connected to nowhere. Therefore, when the power OFF signal is input to the power supply circuit 6 in the short time ON/OFF mode, the charges stored in the capacitors C1 to C3 are not discharged and remain in the capacitors C1 to C3. When the capacitors C1 to C3 are connected to nowhere, discharge (natural discharge) more or less occurs. In the short time ON/OFF mode, ON/OFF of the power is repeated in such a short time that only a small amount of charge is discharged so that latch-up does not occur.

In the present embodiment, for example, the power supply circuit for display unit 10 has two use modes: the normal mode and the short time ON/OFF mode. In the normal mode, it is switched whether or not voltage is output from the power supply circuit 6 based on the power ON/OFF signal input to the power supply circuit 6. In other words, when the power ON signal is input to the power supply circuit 6, the power supply circuit 6 and the capacitors C1 to C3 are connected. When the power OFF signal is input to the power supply circuit 6, the power supply circuit 6 and the capacitors C1 to C3 are disconnected and one terminals of the capacitors C1 to C3 are connected to ground potential in order to discharge the charges stored in the capacitors C1 to C3. On the other hand, in the short time ON/OFF mode, voltage is output from the power supply circuit 6 regardless of whether the signal input to the power supply circuit 6 is ON or OFF. However, when the power OFF signal is input, the power supply circuit 6 does not raise voltage for reducing the power consumption. In such a case, the output voltage of the power supply circuit 6 is decreased depending on the current flowing according to each load of the outputs of the power supply circuit 6 and the leak current of the power supply circuit 6. Therefore, if the power OFF signal is input in the short time ON/OFF mode, only the leak current normally flows in the power supply circuit for display unit 10. When the power ON signal is input to the power supply circuit 6, the power supply circuit 6 and the capacitors C1 to C3 are connected as the same way as in the normal mode. On the other hand, when the signal input to the power supply circuit 6 is the power OFF signal, the power supply circuit 6 and the capacitors C1 to C3 are disconnected and the capacitors C1 to C3 are connected to nowhere. In other words, terminals of the capacitors C1 to C3 are floated and charges stored in the capacitors C1 to C3 are not discharged. Therefore, when the power ON signal is input to the power supply circuit 6 in order to connect the power supply circuit 6 and the capacitors C1 to C3 again, only the charges that are naturally discharged while the power supply circuit 6 and the capacitors C1 to C3 are disconnected are needed to be stored, which makes it possible to reduce power consumption. Further, in the present embodiment, the short time ON/OFF mode is the mode repeating ON/OFF in such a short time that the latch-up does not occur by the charges stored in the capacitors C1 to C3. Therefore, it is possible to prevent latch-up caused by the charges stored in the capacitors C1 to C3 when the power supply circuit 6 and the capacitors C1 to C3 are connected again.

Figure 2A:
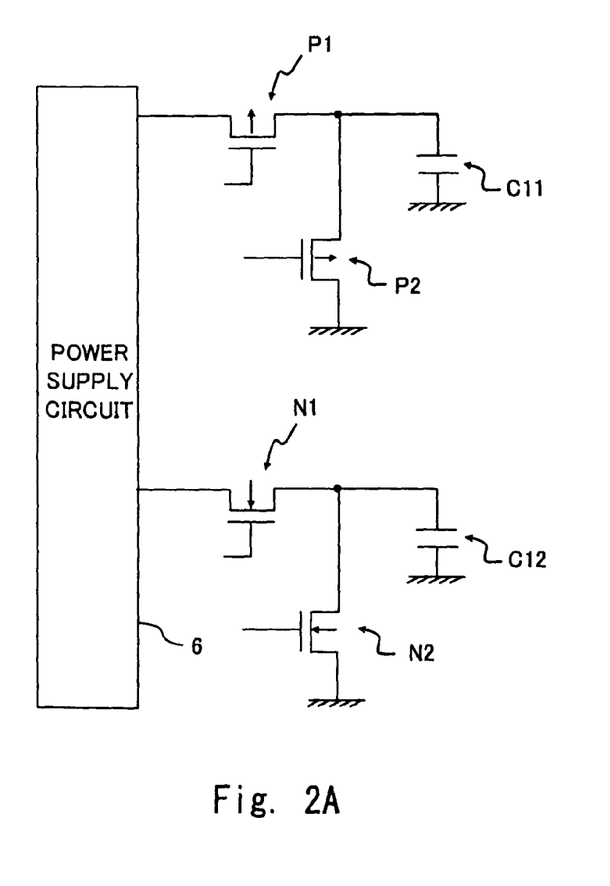
FIGS. 2A and 2B each shows a schematic diagram showing a configuration of switches to which a plurality of voltages are output from the power supply circuit.
Figure 2B:
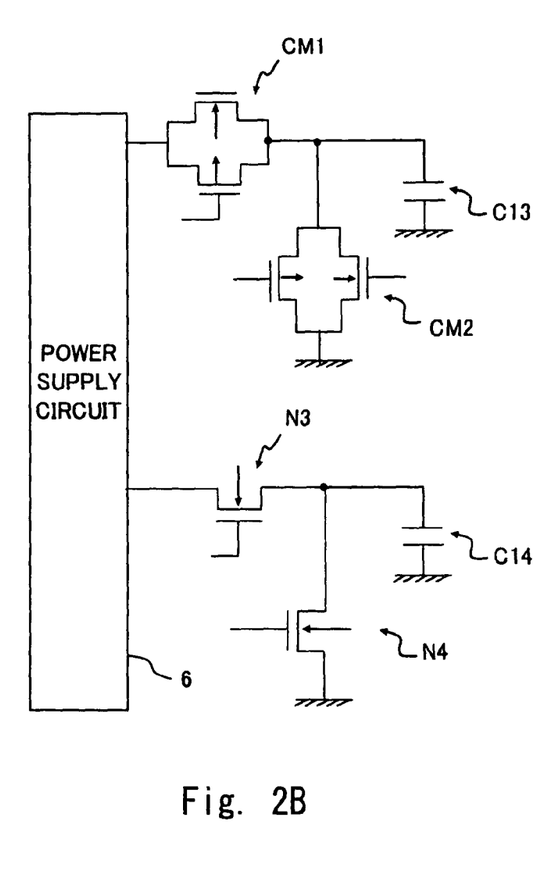

Referring now to FIGS. 2A and 2B, each diagram shows a configuration of the switches to which the plurality of voltages are output from the power supply circuit 6. FIG. 2A shows a schematic diagram of the P channel switches P1 and P2 and N channel switches N1 and N2 connected to the power supply circuit 6. FIG. 2B shows a schematic diagram of the CMOS switches CM1 and CM2 and N channel switches N3 and N4 connected to the power supply circuit 6. Typically, when the plurality of voltages are output from the power supply circuit, different types of switches are connected to the power supply circuit. For example, N channel switches N1 and N2 and P channel switches P1 and P2 are connected to the power supply circuit 6 shown in FIG. 2A. A capacitor C11 is connected to the P channel switches and a capacitor C12 is connected to the N channel switches. The P channel switches P1 and P2 and the N channel switches N1 and N2 are switched depending on whether the output voltage is positive or negative. In the normal mode, when the power ON signal and the power OFF signal are input to the power supply circuit 6, either one of the P channel switches P1 or P2 is turned ON for operation. On the other hand, when the power ON signal is input to the power supply circuit 6 in the short time ON/OFF mode, the P channel switch P1 is turned ON and P2 is turned OFF. When the power OFF signal is input to the power supply circuit 6, both of the P channel switches P1 and P2 are turned OFF. Therefore, the charges stored in the capacitor C11 are not discharged.

Different switches can be connected to the power supply circuit 6. For example, the CMOS switches CM1 and CM2 and N-channel switches N3 and N4 can be connected to the power supply circuit 6 as shown in FIG. 2B. A capacitor C13 is connected to the CMOS switches and a capacitor C14 is connected to the N-channel switches. In the power supply circuit 6 shown in FIG. 2B, the outputs of the positive voltage and the negative voltage are switched by switching the CMOS switches CM1 and CM2 or N-channel switches N3 and N4. When the power OFF signal is input to the power supply circuit 6 in the short time ON/OFF mode, both of the CMOS switches CM1 and CM2 or the N-channel switches N3 and N4 are turned OFF. Therefore, the charges stored in the capacitors C13 and C14 are not discharged.

As shown in FIGS. 2A and 2B, when the plurality of voltages are output from the power supply circuit 6, different kinds of switches such as P-channel switches and N-channel switches are connected to the power supply circuit 6. In such a case, the latch-up may occur by the charges stored in the capacitors C11 to C14 connected to each of the switches.

The display unit of the present embodiment has the short time ON/OFF mode switching ON/OFF of the power in such a short time that the latch-up does not occur by the charges stored in the capacitors. When the power ON signal is input to the power supply circuit 6 in the short time ON/OFF mode, the charges are stored in the capacitors C1 to C3. When the power OFF signal is input to the power supply circuit 6, one terminals of the capacitors C1 to C3 are floated by disconnecting the switches S1 to S3 and the charges stored in the capacitors are not discharged. When the power ON signal is input to the power supply circuit 6 again, the power is turned ON again in the short time. Therefore, it is possible to prevent the latch-up caused by the charges stored in the capacitors C1 to C3. When the power OFF signal is input to the power supply circuit 6, the charges stored in the capacitors C1 to C3 are not discharged. Therefore, it is possible to decrease the amount of the charges stored in the capacitors C1 to C3 when the power ON signal is input to the power supply circuit 6 again, which makes it possible to reduce power consumption.

Figure 3:
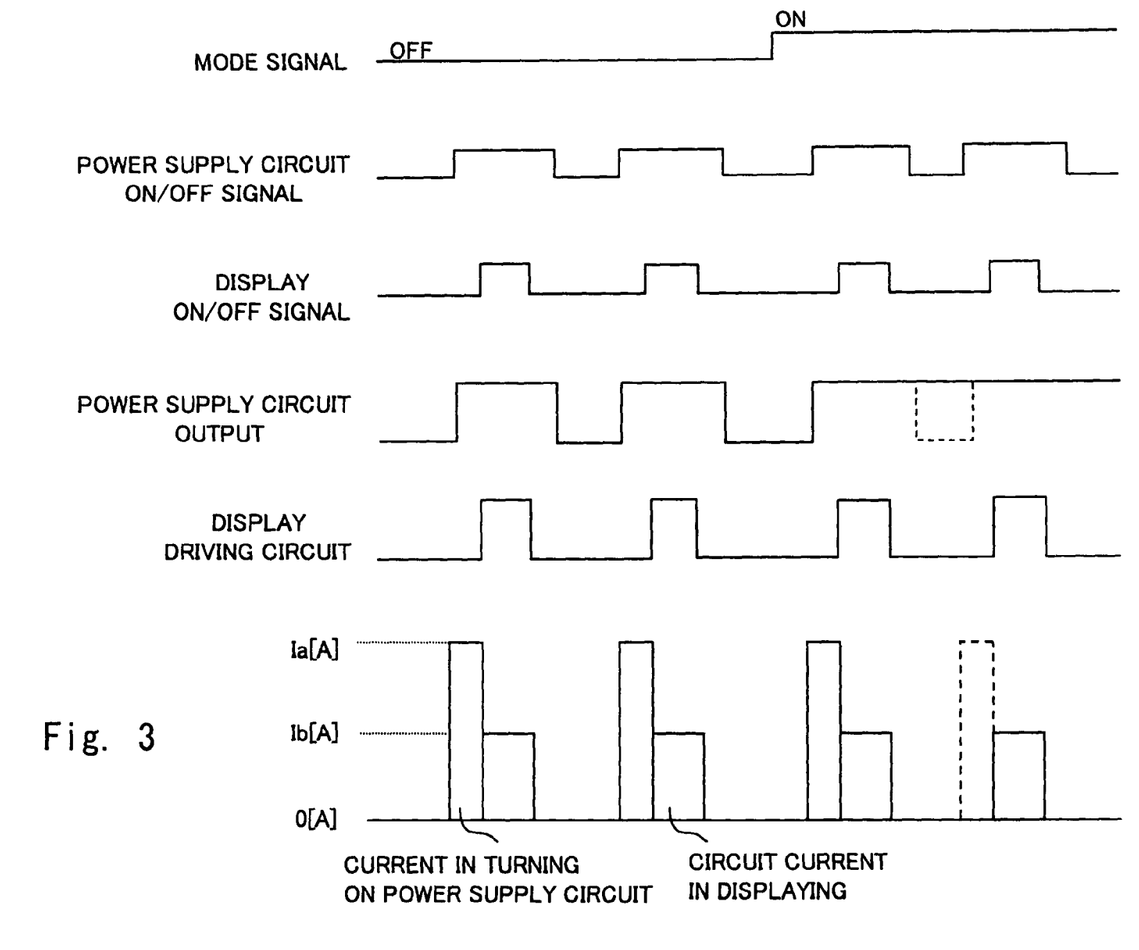
FIG. 3 shows a timing diagram showing a driving timing of the display unit and the power supply circuit for display unit according to the present embodiment.

FIG. 3 shows a driving timing diagram of the above-described display unit 1 and the power supply circuit for display unit 2. When the mode signal is in the normal mode (OFF), voltage output from the power supply circuit 6 is switched based on the power ON/OFF signal. When the power OFF signal is input to the power supply circuit 6 in the normal mode, one terminals of the capacitors C1 to C3 are connected to the ground potential by disconnecting the switches S1 to S3 to discharge the charges stored in the capacitors C1 to C3. In other words, current Ia[A] in turning on the power supply circuit is output when the power ON signal is input to the power supply circuit 6 because charges are not stored in the capacitors C1 to C3 in the power supply circuit for display unit 2. Further, when the display ON signal is input in the display ON/OFF signal, circuit Ib[A] current in displaying is output to drive the display panel 11. On the other hand, in short time ON/OFF mode (ON), voltage is output from the power supply circuit 6 regardless of whether the power ON signal is input or the power OFF signal is input. Note that the power supply circuit 6 does not raise voltage to reduce power consumption when the power OFF signal is input. In such a case, output voltage of the power supply circuit 6 is decreased depending on the current flowing according to each load of the outputs of the power supply circuit 6 and the leak current of the power supply circuit 6. Therefore, if the power OFF signal is input in the short time ON/OFF mode, only the leak current typically flows in the power supply circuit for display unit 10. At this time, the charges stored in the capacitors C1 to C3 are not substantially discharged although a part of the charges are naturally discharged because the switches S1 to S3 connected to the capacitors C1 to C3 are disconnected and one terminals of the capacitors C1 to C3 are floated. Therefore, only the charges that are naturally discharged are needed to be stored when the power ON signal is input to the power supply circuit 6 again. In summary, the current in turning on the power supply circuit Ia[A] is not output because the capacitors C1 to C3 store charges, which makes it possible to reduce power consumption. Further, the short time ON/OFF mode is the mode switching ON/OFF of the power supply circuit 6 in such a short time that the latch-up does not occur by the charges stored in the capacitors C1 to C3 when the signal input to the power supply voltage 6 is switched from the power OFF signal to the power ON signal. Therefore, it is possible to prevent latch-up.

The display unit 1 and the power supply circuit for display unit 2 in the present embodiment includes two modes of the normal mode and the short time ON/OFF mode, for example. In the normal mode, the voltage output from the power supply circuit 6 is switched according to the power ON/OFF signal input to the power supply circuit 6. In other words, the connection of the power supply circuit 6 and the capacitors C1 to C3 is switched according to the power ON/OFF signal input to the power supply circuit 6. On the other hand, in the short time ON/OFF mode, voltage is output from the power supply circuit 6 regardless of whether the signal input to the power supply circuit 6 is power ON signal or power OFF signal. However, the power supply circuit 6 does not raise voltage, and leak current depending on the loads connected to the power supply circuit 6 flows in the display unit driving circuit 10. When the power ON signal is input to the power supply circuit 6, the capacitors C1 to C3 and the power supply circuit 6 are connected. When the power OFF signal is input to the power supply circuit 6, the capacitors C1 to C3 and the power supply circuit 6 are disconnected. In other words, the switches S1 to S3 are disconnected and one terminals of the capacitors C1 to C3 are floated. At this time, the charges are not substantially discharged from the capacitors C1 to C3 although natural discharge occurs. Therefore, a certain amount of charge is stored in the capacitors C1 to C3, and it is not needed to store charges in the capacitors C1 to C3 from the beginning when the power ON signal is input to the power supply circuit 6 again, which makes it possible to reduce power consumption. The short time ON/OFF mode is the mode switching ON/OFF of the power supply circuit 6 in such a short time that the latch-up does not occur by the charges stored in the capacitors C1 to C3 when the signal input to the power supply circuit 6 is switched from the power OFF signal to the power ON signal. Therefore, it is possible to prevent latch-up.

Second Embodiment

The second embodiment will now be described. In the first embodiment, the mode signal such as the short time ON/OFF mode or the normal mode or the like is output from the CPU 3 to the power supply circuit 6. In other words, in the first embodiment, the mode signal is generated based on the signal input from the CPU 3 that is formed externally to the display unit driving circuit 10 to the logic circuit 5. However, the mode signal may be generated in the display unit driving circuit. In the display unit driving circuit in the present embodiment, a counter circuit 12, a sense circuit 13, and a mode control circuit 14 are added in the display unit driving circuit 10 in the first embodiment. Hereinafter, a configuration of a display unit 20 in the present embodiment will be described. In the present embodiment, the same reference symbols are given to the same structures as in the first embodiment and the detailed description thereof will be omitted.

Figure 4:
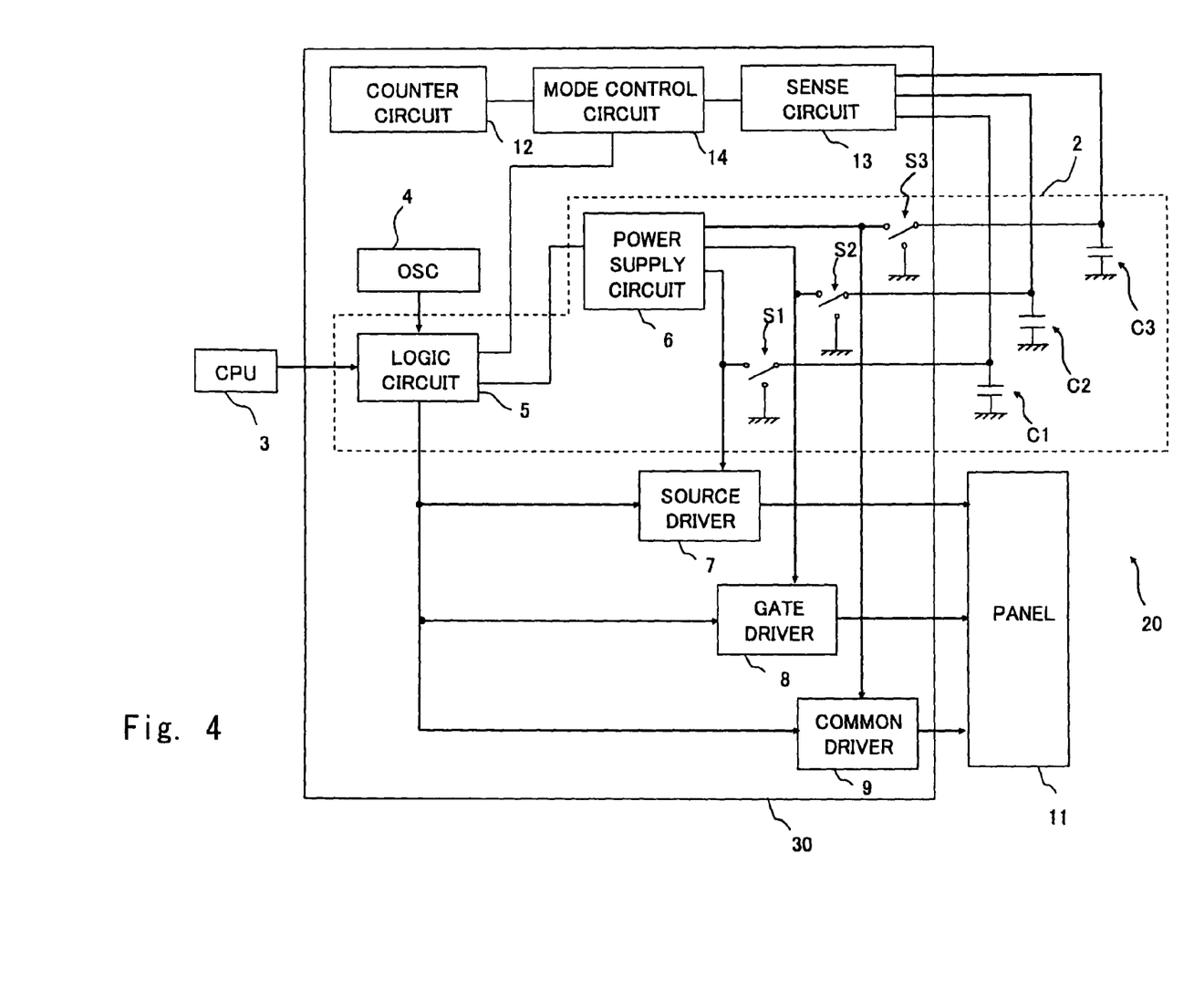
FIG. 4 shows a block diagram showing the display unit and the power supply circuit for display unit according to the present embodiment.

Referring now to FIG. 4, the structure of the display unit 20 according to the present embodiment will be described. As shown in FIG. 4, a display unit driving circuit 30 of the display unit 20 in the present embodiment further includes the counter circuit 12, the sense circuit 13, and the mode control circuit 14. The counter circuit 12 measures time in which the power ON/OFF signal input to the power supply circuit 6 is switched in the short time ON/OFF mode and changes modes according to the time passed after switching of the signals. The sense circuit 13 measures (senses) the amount of the charges stored in each of the capacitors C1 to C3 in the short time ON/OFF mode and changes modes when the amount of stored charges is below a certain level. The mode control circuit 14 is connected to the counter circuit 12 and the sense circuit 13 and controls mode change according to the measurement result in the counter circuit 12 and the sense circuit 13.

Hereinafter, the counter circuit 12, the sense circuit 13, and the mode control circuit 14 will be described in detail. In the short time ON/OFF mode, the counter circuit 12 measures time passed after the power ON/OFF signal input to the power supply circuit 6 is switched from the power ON signal to the power OFF signal, for example. The counter circuit 12 outputs the time passed after the power ON signal is switched to the power OFF signal to the mode control circuit 14. Then the mode control circuit 14 outputs the signal changing the short time ON/OFF mode to the normal mode to the logic circuit 5 according to the passed time. The timing for switching modes are predetermined. This timing is such that the latch-up does not occur by the charges stored in the capacitors C1 to C3 when the power OFF signal is input to the power supply circuit 6 and then the power ON signal is input to the power supply circuit 6. In summary, when the power OFF signal is input to the power supply circuit 6, the charges in the capacitors C1 to C3 are naturally discharged. This natural discharge causes the charge amount in the capacitors C1 to C3 to decrease, which may cause latch-up when the power ON signal is input to the power supply circuit 6 again. Therefore, charge amount that is naturally discharged is predicted from the passed time in advance, and modes are changed to prevent latch-up after the predicted time is passed. When a certain time is passed after the power OFF signal is input to the power supply circuit 6, it is determined that the latch-up occurs by the charges stored in the capacitors C1 to C3 and the mode is changed to the normal mode. When the power OFF signal is input in the normal mode, the switches S1 to S3 are disconnected and the charges stored in the capacitors C1 to C3 are discharged, which makes it possible to prevent latch-up.

Further, in the short time ON/OFF mode, the sense circuit 13 measures the amount of the charges stored in the capacitors C1 to C3 when the power OFF signal is input to the power supply circuit 6. Then the measured amount of charges is output to the mode control circuit 14. The mode control circuit 14 outputs the signal changing the mode from the short time ON/OFF mode to the normal mode to the logic circuit 5 according to the amount of the charges stored in the capacitors C1 to C3. More specifically, the power OFF signal is input to the power supply circuit 6 while the charges stored in the capacitors C1 to C3 are naturally discharged. If the amount of charge is below the amount in which the latch-up does not occur by the charges stored in the capacitors C1 to C3 when the power ON signal is input to the power supply circuit 6 next time, the mode is changed from the short time ON/OFF mode to the normal mode. When the power OFF signal is input in the normal mode, the switches S1 to S3 are disconnected and the charges stored in the capacitors C1 to C3 are discharged. Thus, it is possible to prevent latch-up caused by the charges stored in the capacitors C1 to C3.

In the present embodiment, the counter circuit 12, the sense circuit 13 connected to the capacitors C1 to C3, and the mode control circuit 14 connected to the counter circuit 12 and the sense circuit 13 are provided. In the short time ON/OFF mode, the counter circuit 12 measures time passed after the power OFF signal is input to the power supply circuit 6 and outputs the passed time to the mode control circuit 14, for example. The mode control circuit 14 outputs the signal switching the mode of the display unit driving circuit 30 to the normal mode according to the input passed time to the logic circuit 5 and discharges the charges stored in the capacitors C1 to C3. The sense circuit 13 measures the amount of the charges stored in the capacitors C1 to C3 to output the charge amount to the mode control circuit 14. The mode control circuit 14 outputs the signal switching the mode of the display unit driving circuit 30 to the normal mode according to the input charge amount to the logic circuit 5 and discharges the charges stored in the capacitors C1 to C3. The counter circuit 12, the sense circuit 13, and the mode control circuit 14 are included in the display unit driving circuit 30. Therefore, it is possible to control mode switching in the display unit driving circuit 30. Further, the time in which the amount of the charges stored in the capacitors C1 to C3 becomes lower than the certain level is predetermined. The mode switching is performed based on the predetermined time and the time passed after switching of the modes measured in the counter circuit 12 so as to prevent the latch-up caused by the charges stored in the capacitors C1 to C3. The charges are discharged from the capacitors C1 to C3 from when the power OFF signal is input to the power supply circuit 6 until when the power ON signal is input to the power supply circuit 6 next time. Note that the charge amount that does not cause latch-up by the discharged charges is predetermined. The mode control circuit 14 outputs the signal switching modes when it is determined that charge amount measured by the sense circuit 13 is below the predetermined charge amount. Therefore, it is possible to prevent the latch-up caused by the charges stored in the capacitors C1 to C3.

In the present embodiment, the counter circuit 12 and the sense circuit 13 are formed on the display unit driving circuit 30 and the mode signal is generated in the display unit driving circuit 30. However, either one of the counter circuit 12 or the sense circuit 13 may be provided in the display unit driving circuit 30.

It is apparent that the present invention is not limited to the above embodiment, but may be modified and changed without departing from the scope and spirit of the invention.

What is claimed is:

1. A power supply circuit for a display unit, the power supply circuit comprising:
   a power supply circuit including outputs connected to a plurality of capacitance elements and supplying power to a plurality of drivers, and
   a controller switching connection of the power supply circuit and the capacitance elements depending on a use mode,
   wherein the use mode includes a first use mode connecting one terminal of the capacitance elements to the power supply circuit or ground potential and a second use mode connecting one terminal of the capacitance elements to the power supply circuit or floating one terminal of the capacitance elements.

2. The power supply circuit for display unit according to claim 1, wherein voltage input to at least one of the capacitance elements is different from voltages input to the other capacitance elements when the power supply circuit supplies a plurality of voltages.

3. The power supply circuit for display unit according to claim 1, wherein voltage input to at least one of the capacitance elements is different from voltages input to the other capacitance elements when the power supply circuit supplies a plurality of voltages.

4. A display unit comprising:
   a power supply circuit including outputs connected to a plurality of capacitance elements and supplying power to a plurality of drivers, and
   a controller switching connection of the power supply circuit and the capacitance elements depending on a use mode,
   wherein the use mode is determined according to one of a charge amount in the capacitance elements, and on a time passed after a power OFF state signal is input to the power supply circuit.

5. The display unit according to claim 4, wherein the use mode includes a first use mode connecting one terminal of the capacitance elements to the power supply circuit or ground potential and a second use mode connecting one terminal of the capacitance elements to the power supply circuit or floating one terminal of the capacitance elements.

6. A display unit comprising:
   a power supply circuit including outputs connected to a plurality of capacitance elements and supplying power to a plurality of drivers, and
   a controller switching connection of the power supply circuit and the capacitance elements depending on a use mode,
   wherein the use mode is determined based on charge amount in the capacitance elements.

7. A display unit comprising:
   a power supply circuit including outputs connected to a plurality of capacitance elements and supplying power to a plurality of drivers, and
   a controller switching connection of the power supply circuit and the capacitance elements depending on a use mode,
   wherein the use mode is changed based on the time passed after a power OFF signal is input to the power supply circuit.

8. The display unit according to claim 4, wherein voltage input to at least one of the capacitance elements is different from voltages input to the other capacitance elements when the power supply circuit supplies a plurality of voltages.

9. The display unit according to claim 5, wherein the use mode is determined based on charge amount in the capacitance elements.

10. The display unit according to claim 5, wherein the use mode is changed based on the time passed after a power OFF signal is input to the power supply circuit.

11. The display unit according to claim 6, wherein the use mode is changed based on the time passed after a power OFF signal is input to the power supply circuit.

12. The power supply circuit for display unit according to claim 1, wherein the use mode is determined or changed to prevent a latch-up.

13. The power supply circuit for display unit according to claim 1, wherein the use mode is determined or changed to reduce a potential of a latch-up condition.

14. The power supply circuit for display unit according to claim 1, wherein the use mode is switched between different modes to reduce a potential of a latch-up condition from charges stored in the capacitance elements.

15. The power supply circuit for display unit according to claim 1, wherein the use mode includes an increase in frequency in switching between an on and off state of the power.

* * * * *